United States Patent [19]
Sivakumar et al.

[11] Patent Number: 5,679,261
[45] Date of Patent: *Oct. 21, 1997

[54] USE OF SILICON CONTAINING POLYELECTROLYTES IN WASTEWATER TREATMENT

[75] Inventors: Ananthasubramanian Sivakumar, Naperville; Manian Ramesh, Lisle, both of Ill.

[73] Assignee: Nalco Chemical Company, Naperville, Ill.

[*] Notice: The term of this patent shall not extend beyond the expiration date of Pat. No. 5,560,832.

[21] Appl. No.: 717,649

[22] Filed: Sep. 23, 1996

Related U.S. Application Data

[63] Continuation-in-part of Ser. No. 565,479, Nov. 30, 1995, Pat. No. 5,589,075.

[51] Int. Cl.$^6$ .......................................... C02F 1/56
[52] U.S. Cl. ..................... 210/727; 210/734; 210/735
[58] Field of Search ................................. 209/5; 210/725, 210/727, 728, 734, 735, 917, 928

[56] References Cited

U.S. PATENT DOCUMENTS

| | | | |
|---|---|---|---|
| 3,624,019 | 11/1971 | Anderson et al. | 260/29.6 H |
| 4,151,202 | 4/1979 | Hunter et al. | 526/310 |
| 4,155,847 | 5/1979 | Tanaka et al. | 210/928 |
| 4,308,149 | 12/1981 | Selvarajan | 210/736 |
| 4,655,934 | 4/1987 | Rose et al. | 210/728 |
| 4,801,388 | 1/1989 | Fong et al. | 210/701 |
| 4,929,655 | 5/1990 | Takeda et al. | 524/458 |
| 5,006,590 | 4/1991 | Takeda et al. | 524/458 |
| 5,120,797 | 6/1992 | Fong et al. | 525/329.4 |
| 5,200,089 | 4/1993 | Siefert et al. | 210/725 |
| 5,209,854 | 5/1993 | Reed et al. | 210/928 |
| 5,283,306 | 2/1994 | Ramesh et al. | 526/312 |
| 5,292,793 | 3/1994 | Ramesh et al. | 524/555 |
| 5,314,627 | 5/1994 | Ramesh et al. | 210/734 |
| 5,338,816 | 8/1994 | Ramesh et al. | 526/312 |
| 5,435,921 | 7/1995 | Collins et al. | 210/917 |
| 5,476,522 | 12/1995 | Kerr et al. | 210/734 |
| 5,560,832 | 10/1996 | Ramesh et al. | 210/708 |
| 5,589,075 | 12/1996 | Sivakumar et al. | 210/727 |

Primary Examiner—Peter A. Hruskoci
Attorney, Agent, or Firm—Robert A. Miller; James J. Drake

[57] ABSTRACT

The invention is a method for clarifying waste water containing turbidity-causing components which comprises: adding to said water an effective turbidity-reducing amount of a water-soluble silicon-containing copolymer coagulant prepared from diallyldimethylammonium halide and a vinyltrialkoxysilane; mixing said copolymer and said water with a mechanical stirring device for sufficient time to allow flocculation of the turbidity-causing components; and then separating the flocculated turbidity-causing components from the waste water to obtain clarified water. Useful polymers for the practice of this invention are copolymers of diallyldimethylammonium halide and vinyltrialkoxysilane.

11 Claims, No Drawings

USE OF SILICON CONTAINING POLYELECTROLYTES IN WASTEWATER TREATMENT

The present application is a continuation-in-part of Ser. No. 08/565,479, filed Nov. 30, 1995, now U.S. Pat. No. 5,589,075 by Ananthasubramanian Sivakumar, John H. Collins and Manian Ramesh, entitled "Use of Silicon Containing Polyelectrolytes in Wastewater Treatment", the disclosure of which is incorporated herein by reference.

FIELD OF INVENTION

The invention is a method for clarifying waste water containing turbidity-causing components which comprises: adding to said water an effective turbidity-reducing amount of a water-soluble silicon-containing copolymer coagulant prepared from diallyldimethylammonium halide and a vinyltrialkoxysilane; mixing said copolymer and said water with a mechanical stirring device for sufficient time to allow flocculation of the turbidity-causing components; and then separating the flocculated turbidity-causing components from the waste water to obtain clarified water. Useful polymers for the practice of this invention are copolymers of diallyldimethylammonium halide and vinyltrialkoxysilane.

BACKGRROUND OF THE INVENTION

Many industrial processes require utilization of large amounts of water. In order to recycle this waste water, it must be treated before it can be reused. Effective recycling may include the removal of turbidity-causing components from the waste water.

Turbidity-causing components can be any organic or inorganic species of sufficient particle or droplet size to create a turbid, light-dispersed appearance in waste waters, industrial waters, or natural waters. These turbidity-causing components can be of an inorganic nature, an organic nature, a pigment dispersion, a colloidal humic material suspension, sewage components, or admixtures of any of the above in any ratio in waters of any description thereby obtaining a turbid translucent effect.

Turbid waters are any type of waters having dispersed therein any type of turbidity-causing component, as described above, or any other type of turbidity-causing component which might be similar in effect when dispersed in these types of waters. For example, colloidal matter of either organic or inorganic or even mixed organic and inorganic character can be turbidity-causing. Such components may vary greatly in nature and concentration, but generally contain a highly anionic surface charge which causes the colloidal particles to repel one another, thus remaining dispersed in the water, rather than settling out in a reasonable time frame.

Examples of turbid waters include waste waters expelled from hydrocarbon processing plants, waste waters expelled from chemical processing plants which synthesize various types of rubber latexes, and effluent waters expelled from various kinds of processing plants using materials containing emulsified components which are of a hydrocarbon nature. Further, the waste waters may be from automotive plants or machining plant operations.

A common method for removal of suspended solids from various types of turbid waters is by the well-known chemical process of clarification. The primary unit operations in clarification are coagulation combined with or followed by flocculation. Coagulation is defined as destabilization of the solids through neutralization of the surface charge on particles or droplets dispersed in the water. Flocculation is defined as the agglomeration or coalescence of small particles or droplets into larger particles or droplets usually through bridging, generally called floc.

Wastewater clarification is the unit operation where the solids particles are separated from the water through gravity settling. There are two types of wastewater clarification, primary and secondary.

In primary clarification, the solids particles are mainly inorganic in nature such as fibers, clay etc. In secondary clarification, the particles are biosolids (microorganisms) from the aeration basin (in the aeration basin, the microorganisms remove the soluble organics in the wastewater). Often, in wastewater clarification, polymers are used to help in the settling of the particles. The performance of the polymers is evaluated on the turbidity and TSS (total suspended solids) of the supernatant. The turbidity of the supernatant correlates directly with the TSS.

A method of clarification usually comprises addition to the aqueous solution to be treated of certain chemical additives known as coagulants, mixing of the chemical additive and aqueous liquid whereby floc formation occurs, and subsequent removal of this floc by a variety of methods. In some cases, the addition of a second higher molecular weight water-soluble polymer, generally known as a flocculant may aid in the formation of floc. The removal of floc may be achieved by mechanical separation means or by merely allowing forces of gravity to work upon the agglomerated solids whereby a removable sludge layer is created.

Among effective coagulants for this purpose are water-soluble cationic polymers. These materials function by neutralizing the charge on the surface of the dispersed particles or droplets which allow the turbidity-causing materials present in turbid waters to agglomerate or coalesce, and to settle, or float to the top of the aqueous medium where they are collected and removed by techniques familiar to the those skilled in the art.

For an example of effective coagulants, water-soluble cationic polymers in conjunction with polynuclear aluminum species for clarifying waters containing turbidity-causing components are disclosed in U.S. Pat. No. 4,655,934. Another example which discloses the reaction products of phenol, formaldehyde, and low molecular weight polyamines useful for removing turbidity from low turbidity industrial waste waters is disclosed in U.S. Pat. No. 4,308,149. DADMAC/VTMS copolymers have been disclosed in U.S. Pat. No. 5,560,832 entitled "Copolymers of Vinyl Trimethoxysilane and Diallyldimethylammonium Chloride as Demulsifiers in Oily Wastewater". However, there are several differences between that application and the present invention. First, there is no oil or any hydrocarbon present in the wastewater clarification operation, unlike in emulsion breaking. Secondly, in emulsion breaking, the hydrophobicity of the oil droplets plays an important role in the interaction of the polymer with the oil droplet. In addition to charge neutralization, in order to be effective in emulsion breaking, the polymer needs to overcome other stabilizing factors such as steric hindrance due to surfactants and solids at the oil-water interface. Thirdly, in wastewater clarification, electrostatic repulsion is the main stabilizing factor. However, in the case of the biosolids, there is a strong interaction of the polymer with the biopolymers (polysaccharides and proteins) which are present, not only on the solid particles but also in the water. The biopolymers can form a complex with the polymer in the water phase and thus significantly affect the interaction of the polymer with the solid particles and hence its performance. No biopolymers are present in the oily wastewaters encountered in emulsion breaking. Therefore, more efficient processes for the removal of turbidity in wastewater clarification would represent an improvement over the prior art.

In addition to the removal of turbidity-causing components from waste water, many industrial processes necessitate removal of color before recycling of the water. Particularly, color removal from the effluent streams of paper mills presents a problem within the pulp and paper industry. It is necessary that these waste waters be treated for color removal prior to discharge.

SUMMARY OF THE INVENTION

The invention is a method for clarifying waste water containing turbidity-causing components which comprises: adding to said water an effective turbidity-reducing amount of a water-soluble silicon-containing copolymer coagulant prepared from diallyldimethylammonium halide and a vinyltrialkoxysilane; mixing said copolymer and said water with a mechanical stirring device for sufficient time to allow flocculation of the turbidity-causing components; and then separating the flocculated turbidity-causing components from the waste water to obtain clarified water. Useful polymers for the practice of this invention are copolymers of diallyldimethylammonium halide and vinyltrialkoxysilane.

DESCRIPTION OF THE INVENTION

The invention is a method for clarifying waste water containing turbidity-causing components which comprises the step of adding an effective turbidity-reducing amount of a water-soluble, surface active, silicon-containing copolymer coagulant to said water wherein the polymer made by free radical polymerization comprises:

A. from 0.01 to 10 mole percent of a vinyl alkoxysilane monomer; and

B. from 90 to 99.99 mole percent of a second monomer selected from the group consisting of acrylamide, acrylic acid and its alkali metal salts, dimethylaminoethyl (propyl) acrylate methyl chloride quaternary, diallyldimethylammonium chloride, maleimide, vinyl formamide, vinyl acetate, itaconic acid, maleic anhydride, fumaric acid, aconic acid, acrylamido methyl propane sulfonic acid and its alkali metal salts, $C_6$–$C_{20}$ alkyl esters of acrylic acid, phenethyl ester of acrylic acid, nonyl-α-benzyl ester of acrylic acid, dimethyl acrylamide, diethyl acrylamide, tributyl acrylamide, dimethylaminoethylacrylate benzyl chloride quaternary, 3-methylacrylamide propyl trimethyl ammonium chloride, acrylamidomethyl butanoic acid and combinations thereof.

The vinyl alkoxysilane monomer may be selected from the group consisting of vinyltrimethoxysilane and vinyl triethoxysilane and the second monomer may be diallyldimethylammonium chloride. Preferably, the vinyl alkoxysilane monomer is vinyltrimethoxysilane.

The coagulant may have a reduced specific viscosity in one molar sodium nitrate solution for one percent polymer actives from 0.2 to 5 dl/gm. Preferably, the coagulant may have a reduced specific viscosity in one molar sodium nitrate solution for one percent polymer actives from 0.5 to 4.0 dl/gm. Most preferably, the coagulant may have a reduced specific viscosity in one molar sodium nitrate solution for one percent polymer actives from 0.7 to 3.0 dl/gm.

The mole ratio of diallyldimethylammonium chloride to vinyltrimethoxysilane ranges from 99.9:0.10 to 95.0:5.0.

The waste water may be treated with from about 0.1 to about 500 parts per million of the water-soluble silicon-containing copolymer coagulant. Preferably, the waste water may be treated with from about 0.5 to about 100 parts per million of the water-soluble silicon-containing copolymer coagulant. Most preferably, the waste water is treated with from about 2 to about 30 parts per million of the water-soluble silicon-containing copolymer coagulant.

A flocculant may also be added to said waste water. The flocculant may be a copolymer of acrylamide and acrylic acid.

The invention is a method for clarifying waste water containing turbidity-causing components which comprises: a) adding to said water an effective turbidity-reducing amount of a water-soluble silicon-containing copolymer coagulant prepared from diallyldimethylammonium halide and a vinyltrialkoxysilane; b) mixing said copolymer and said water with a mechanical stirring device for sufficient time to allow flocculation of the turbidity-causing components; and then c) separating the flocculated turbidity-causing components from the waste water to obtain clarified water.

The vinylalkoxysilane monomers useful in the copolymer composition of the invention contain an alkyl group of from 1–4 carbon atoms. As such vinyltrimethoxy, triethoxy, tripropoxy and tributoxysilanes, and combinations thereof, may find use in the subject invention. While vinyltrialkoxysilanes are preferred, the monomers may be mono or di-substituted as well, or mixtures of mono-, di- and tri-alkoxy substituted silanes may be used. A preferred vinyltrialkoxysilane for use in this invention is vinyltrimethoxysilane. Vinyltrimethoxysilane is commercially available from the Dow Corning Corporation; Midland, Mich.; and from Hüls America, Piscataway, N.J.

Useful vinylalkoxysilanes may include vinyltrimethoxysilane, vinyltriethoxysilane, vinyltris(β-methoxyethoxy)silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyoxysilane, vinyldimethoxyoleyloxysilane, and polyethyleneglycol-modified vinylsilane.

Diallyldimethylammonium halides, especially diallyldimethylammonium chloride are well-known and commercially available from a variety of sources. One method for the preparation of DADMAC is detailed in U.S. Pat. No. 4,151,202, the disclosure of which is hereinafter incorporated by reference into this specification.

The mole ratio of DADMAC to the vinyltrialkoxysilane ranges from 99.99:0.01 to 80:20 and, preferably from 99.9:0.1 to 85:15. Most preferably, the mole ratio of DADMAC to the vinyltrialkoxysilane range from 99.9:0.1 to 95.0:5.0.

The polymers may be prepared as in conventional vinyl polymerization techniques. These techniques include conventional solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590 the disclosures of which are also hereinafter incorporated by reference into this specification.

Conventional free radical catalysis may be used including both free radical initiators and red-ox systems. Such polymerizations are within the purview of those skilled in the art and as such will not be elaborated on in this specification.

The molecular weights of the copolymer prepared hereunder can vary greatly. Generally, copolymers of diallyldimethylammonium chloride and vinyltrimethoxysilane produced hereunder will have a molecular weight of from 50,000 to 5,000,000, and preferably 100,000 to 2,500,000, and most preferably from 150,000 to 1,500,000.

While discussed herein as copolymers of diallyldimethylammonium halides and vinylalkoxysilanes, other monomers may be incorporated into the resultant polymers without detracting from the spirit and intent of the invention. Possible monomers that may be incorporated include, but are not limited to polymerizable nonionic, and cationic vinyl monomers. These materials are exemplified by acrylamide, and such cationic monomers as dimethylaminoethylmethacrylate and dimethylaminoethyl acrylate and their respective water soluble quaternary ammonium salts.

The copolymers of this invention may be used alone, or in combination with a high molecular weight anionic or non-ionic water soluble or dispersible flocculant. Such polymers include polyacrylamide, and copolymers of acrylamide with acrylic acid and its water soluble alkali metal or ammonium salts. As used herein, the term acrylic acid is meant to encompass such water soluble salts. Also useful are such polymers as sulfomethylated acrylamides as exemplified in U.S. Pat. Nos. 5,120,797 and 4, 801,388, the disclosures of which are hereinafter incorporated by reference into this specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferably 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30.

The flocculants of this invention may be prepared in solution form, or in water-in-oil emulsion form. The preparation of such flocculants is known to those skilled in the art. The flocculants generally have molecular weights ranging from as low as 1,000,000 to 40,000,000 or higher. Preferred flocculants have a molecular weight of about 10,000,000. The upper weight of molecular weight is not critical so long as the polymer is water soluble or dispersible.

The following examples are presented to describe preferred embodiments and utilities of the invention and are not meant to limit the invention unless otherwise stated in the claims appended hereto.

EXAMPLE 1

A 90:10 mole copolymer of diallyldimethylammonium chloride (DADMAC) and vinyltrimethoxysilane (VTMS), at 20% actives, was prepared for use as a coagulant. The following reactants were used to form the silicon containing polyelectrolyte copolymer coagulant:

| | |
|---|---|
| 312.91 grams | Diallyldimethylammonium Chloride DADMAC (a 58% Solution) |
| 18.89 grams | Vinyltrimethoxysilane (a 98% Solution) |
| 200.0 grams | Deionized Water |
| 1.80 grams | [2,2'-Azobis(2-amidinopropane)] Dihydrochloride Initiator |
| 20.0 grams | Sodium Chloride |
| 446.20 | Final Dilution Water |
| 0.1 grams | Versene |

A semi-batch process was used to prepare the DADMAC/VTMS copolymer.

A 1.5 L reactor equipped with a mechanical stirrer a thermocouple, nitrogen inlet/outlet tubes, condenser and two syringe pumps was set up. Vinyltrimethoxysilane was taken in the first pump which was set at a delivery rate of 4.5 cc/hr. The second pump contained an aqueous solution of 2,2' azobis (2-amidinopropane) dihydrochloride (1.2 g in 48.8 g DI water), and the pump was set at 12.5 cc/hr.

The DADMAC, sodium chloride, and Versene were charged into a polymerization reactor and heated to 52° C. The reaction mixture was purged with nitrogen. VTMS and initiator-containing pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then subjected to a post treatment at 82° C. for 5 hours.

Product phase separated in two days and indicated extensive crosslinking as shown below:

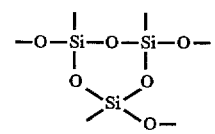

The phase-separated product swelled in water, yet was water-insoluble.

EXAMPLE 2

A 99.5/0.5 mole ratio copolymer of diallyldimethylammonium chloride (DADMAC) and vinyltrimethoxysilane (VTMS), at 20% actives, was prepared for use as a coagulant. The following reactants were used to form the silicon containing polyelectrolyte copolymer coagulant:

| | |
|---|---|
| 321.3 grams | DADMAC (a 62% Solution) |
| 1.00 grams | VTMS (a 98% Solution) |
| 0.2 grams | Versene |
| 258.8 grams | Deionized Water |
| 1.20 grams | 2,2'-Azobis[2(2-imdazolin-2-yl)propane Dihydrochloride Initiator |
| 61.00 grams | Sodium Chloride |
| 356.87 grams | Dilution Water |

A batch process was used to prepare the DADMAC/VTMS copolymer. A reactor similar to the one described in Example 1 was used.

The DADMAC, VTMS, Versene, sodium chloride and deionized water were charged into a polymerization reactor at a temperature of 58° C. Thereafter, the initiator (0.6 grams in 49.4 grams deionized water) was charged into the reactor dropwise via a syringe pump at 12.5 cc/hour.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, initiator (0.6 grams in 19.4 grams of deionized water) was added. The reactor was heated to 82° C. and held at that temperature for 3 hours. The reaction product was then diluted with 356.87 grams of water and stored. Reduced specific viscosity and intrinsic viscosity measurements were determined on a 1% polymer solution in $NaNO_3$ (sodium nitrate) and found to be 2.02 and 1.3 dl/gm respectively.

EXAMPLE 3

A 99.0/1.0 mole ratio DADMAC/VTMS copolymer was prepared using the procedure of Example 2. 2.0 g of VTMS and 355.07 g of DI water were used in place of the amounts in Example II. All other quantities were the same. RSV/IV for a 1% by weight solution of the polymer in sodium nitrate were 2.2 and 1.2 dl/g, respectively.

EXAMPLE 4

A 99.0/1.0 mole ratio copolymer of diallyldimethylammonium chloride (DADMAC) and vinyltrimethoxysilane (VTMS), at 20% actives, was prepared for use as a coagulant. The following reactants were used to form the silicon containing polyelectrolyte copolymer coagulant:

| | |
|---|---|
| DADMAC (monomer) 40% solution | 495.00 g |
| VTMS (vinyltrimethoxysilane) | 2.00 g |
| Versene | 0.20 g |
| Ammonium Persulfate (APS) | 3.90 g |
| Deoinized Water | 20.00 g |
| Ammonium Persulfate (APS) | 1.90 g |
| Deionized Water | 20.0 g |
| Dilution Water | 195.00 g |
| Final Water | 262.90 g |
| Sodium bisulfite | 1.00 g |
| | 1,000.00 g |

1. Versene, and DADMAC monomer were taken in a conventional polymer reactor as described in Example 1.
2. The reactor was heated to 57° C. under constant $N_2$ purging, and stirred at 400 rpm.
3. VTMS was added immediately followed by the APS solution (2.0 g in 20 g water).
4. The reactor was held at 57° C. for 3 hours. During this period, dilution water (195 g) was added at a rate of 65 g/hr.
5. The reactor was then heated to 82° C.; and a solution of APS (0.97 g) in water (10 g) was added.
6. After holding at 82° C. for 2 hours, the reactor was cooled to room temperature. Sodium bisulfite was added to prevent degradation to the reactor and mixed for 1.5 min.
7. The product was transferred into a storage container.
   Reduced specific viscosity and intrinsic viscosity measurements were determined on a 1% polymer solution in $NaNO_3$ (sodium nitrate) and found to be 1.6 and 0.9 dl/gm respectively.

EXAMPLE 5

The polymer was added to the wastewater at the desired concentration and mixed at 330 rpm for 1 minute, followed by mixing at 50 rpm for 2.5 minutes and 2.5 minutes of settling. The supernatant was then analyzed for turbidity expressed as NTU using a Hach turbidimeter.

The data in Table I was obtained by experimentation on wastewater from an industrial facility in the Northwest.

A comparison of the conventional solution poly (DADMAC) treatment to the copolymers of the instant invention was performed. Poly(DADMAC/VTMS) was much more efficient at turbidity removal, as evidenced by lower NTU readings at comparable dosages.

TABLE I

| | Turbidity (NTU) | |
|---|---|---|
| Dosage (ppm) | poly(DADMAC) | poly(DADMAC/VTMS)[1] |
| 2 | | 101 |
| 2.5 | 117 | |
| 3 | | 64.5 |
| 3.75 | 84 | |
| 4 | | 33.4 |
| 4.5 | 49 | |
| 5 | | 37.2 |
| 5.25 | 48 | |
| 6 | 54 | 19.4 |
| 6.75 | 33 | |
| 7 | | 21.4 |
| 8.25 | 36 | |
| 9 | | 19.9 |
| 9.75 | 33.2 | |
| 11 | | 19.4 |

[1] = The polymer was prepared according to the procedure described in Example IV.

Changes can be made in the composition, operation and arrangement of the method of the present invention described herein without departing from the concept and scope of the invention as defined in the following claims.

We claim:

1. A method for clarifying waste water containing organic turbidity-causing components in secondary clarification which comprises the step of adding an effective turbidity-reducing amount of a water-soluble, surface active, silicon-containing copolymer coagulant to said water wherein the polymer made by free radical polymerization comprises:

A. from 0.1 to 10 mole percent of a vinyl alkoxysilane monomer; and
   B. from 90 to 99.9 mole percent of diallyldimethylammonium chloride, wherein the coagulant has a reduced specific viscosity in one molar sodium nitrate solution for one percent polymer actives from 0.2 to 5 dl/gm, flocculating the turbidity-causing components, and separating the flocculated turbidity-causing components from the waste water to obtain clarified water.

2. The method of claim 1 wherein the vinyl alkoxysilane monomer is selected from the group consisting of vinyltrimethoxysilane and vinyl triethoxysilane.

3. The method of claim 2 wherein the vinyl alkoxysilane monomer is vinyltrimethoxysilane.

4. The method of claim 3 wherein the coagulant has a reduced specific viscosity in one molar sodium nitrate solution for one percent polymer actives from 0.5 to 4.0 dl/gm.

5. The method of claim 3 wherein the coagulant has a reduced specific viscosity in one molar sodium nitrate solution for one percent polymer actives from 0.7 to 3.0 dl/gm.

6. The method of claim 3 wherein the mole ratio of diallyldimethylammonium chloride to vinyltrimethoxysilane ranges from 99.9:0.10 to 95.0: 5.0.

7. The method of claim 3 wherein the waste water is treated with from about 0.1 to about 500 parts per million of the water-soluble silicon-containing copolymer coagulant.

8. The method of claim 3 wherein the waste water is treated with from about 0.5 to about 100 parts per million of the water-soluble silicon-containing copolymer coagulant.

9. The method of claim 3 wherein the waste water is treated with from about 2 to about 30 parts per million of the water-soluble silicon-containing copolymer coagulant.

10. The method of claim 3 further comprising the addition of a flocculant to said waste water.

11. The method of claim 3 wherein said flocculant is a copolymer of acrylamide and acrylic acid.

* * * * *